May 22, 1951
A. A. BERNARD
2,554,236
ARC WELDING TORCH AND ELECTRODE
Filed March 2, 1949
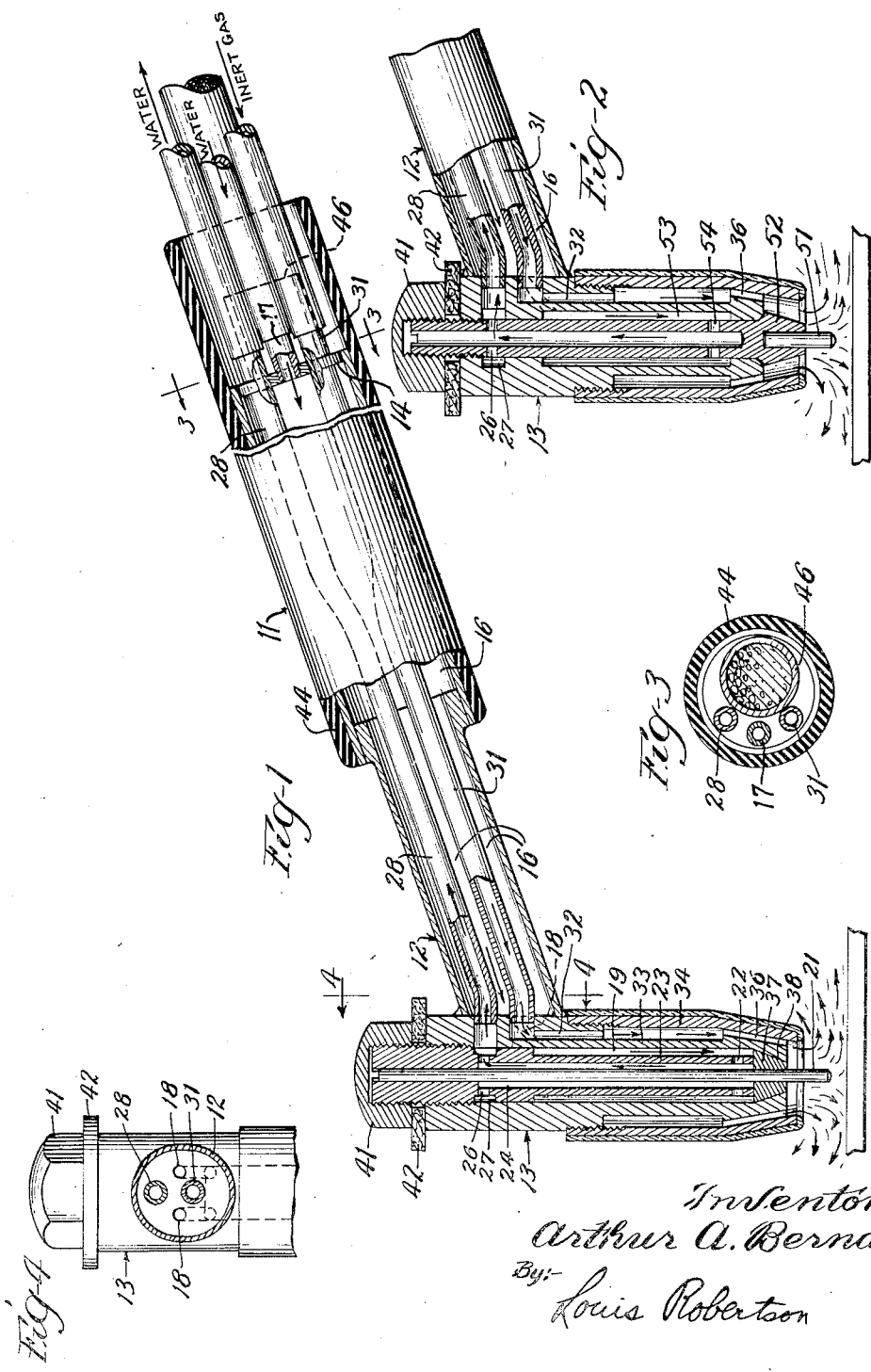
Inventor
Arthur A. Bernard
By:- Louis Robertson
Atty.

Patented May 22, 1951

2,554,236

UNITED STATES PATENT OFFICE 2,554,236

ARC WELDING TORCH AND ELECTRODE

Arthur A. Bernard, Chicago, Ill.

Application March 2, 1949, Serial No. 79,147

15 Claims. (Cl. 219—14)

This invention relates to arc welding and more particularly to the process of welding which is generally known as inert gas arc welding.

With this process the welding arc and the molten weld metal produced by the heat of the arc are flooded with an atmosphere of inert gas, generally helium or argon, to protect the molten weld metal and the welding electrode from becoming oxidized by contact with surrounding air.

The inert arc process is an old art. However, it was only during the last few years that the advantages of shielding the arc with inert gas became fully recognized. Prior to the present invention the process was limited to welding only the thinnest gauges of metal. This was so for the reason that, as compared to the other more commonly used arc welding processes, the inert arc process was limited to the use of low welding currents. Higher currents would melt enough of the electrode to cause some of the electrode metal to pass over to the work piece. Although this is desirable for other welding, it must not be permitted when welding metals for which inert gas welding is used. Generally the electrode used by the process is of a metal which is inaccurately referred to as being practically non-consumable.

In that tungsten has the highest melting point of all the available metals, it is this metal which is generally used for the electrode. Even this metal, however, has a melting point which is considerably less than the temperature of the welding arc.

The amount of welding current which can be used by prior art welding torches is governed by the method which is used to remove heat from the electrode which is absorbed from the arc. Regarding the first models which were offered to the welding industry, the only means used was to use the inert gas as the cooling agent by flowing the gas through the torch and over at least some portion of the electrode surface. It is obvious with this method that if the amperage of welding current used and hence the intensity of arc heat produced is such that the heat which is absorbed by the electrode raises its temperature above its melting point then the electrode will melt and transfer through the arc to the base metal.

To make possible the use of higher welding currents than with the gas cooling mentioned above, improvements were made in later models by water cooling the torches. Regarding the first of these models, the water was circulated only as far as the handle of the torch. In later models the water was circulated through the handle and down into the head of the torch. By thus cooling the head, the collet which grips the electrode was also cooled, which in turn cooled the electrode. However, even with these models the volume of welding currents which could be used was considerably less than the volume necessary to provide economical welding.

The main reason why these torches were so limited in regards to the volume of current used is as follows. During welding the tip of the electrode is in direct contact with an arc temperature which is considerably higher than the melting point of the electrode (about 2,000° F. higher than the melting point of tungsten). In fact, when alternating current is used the arc temperature which is in contact with the tip of the electrode is equal to the temperature which exists at the work piece, which of necessity must be sufficiently high to fuse the work piece. Obviously the electrode absorbs its portion of the arc heat at its tip end and this heat is conducted up into the electrode where a certain portion of it is absorbed by the collet which grips the electrode. The body of the holder which is threaded to the collet (in these prior forms) absorbs some heat from the collet. Water is being constantly circulated through passageways in the body and absorbs the heat from the body, and this heat is carried away by the water circulation. The factor which limits this method is that the heat which is absorbed by the electrode must travel too great a distance before it is absorbed by the circulating water. Another objectionable factor is poor heat conductivity which exists between the electrode and the jaws of the collet and at the threaded joint between the collet and the body. A slight space or lack of uniform metallic contact, even though microscopic, insulates the electrode from the cooling effect of the circulated water.

Regarding the present invention, water is circulated directly over the surface of the electrode, and further, the surface thus cooled extends to within one-half inch of the tip of the electrode where the arc heat is present. Therefore, if water at normal temperatures, as for example 60° F., is being circulated, the temperature of the electrode in turn is quite low only one-half inch from the arc end. The shortness of this dimension is an important factor for the following reason. The heat gradient varies over the one-half inch dimension from a temperature which is somewhat above the melting point of the tungsten at the arc end and drops down to relatively close to the temperature of the coolant used; then the temperature of the electrode one-eighth of an inch back from the tip of the electrode is considerably less than the melting point of the electrode, in which case a globule of electrode metal of sufficient size to be detached from the tip of the electrode by gravity cannot be formed.

Although water is referred to for convenience, the invention is not limited to refrigerating the electrode by water only. Other liquid refrigerants could be used, such as oil, brine, mercury or liquid air.

By the invention, arcing currents as high as 800 amperes have been used experimentally with one-eighth inch diameter electrode. This current density is on the order of 64,000 amperes per square inch area. Even a more conservative practical estimate of 600 amperes is about three times greater than that which is possible in torches which cool only certain parts of the holder and not the electrode directly.

An object of the invention is to provide an inert gas arc welding torch which can use welding currents higher than possible with inert gas welding heretofore, and preferably as high as the older and more generally known fluxed electrode arc process and submerged arc processes, so as to be economically competitive with these processes.

Another object is to provide a torch which does not require the use of the inert gas to aid in keeping the electrode cool and therefore consumes only that volume of gas which is required for shielding the welding operation.

Another object is to provide an unusually lightweight torch so that its use does not fatigue the operator.

Additional objects and advantages of the invention will be apparent from the following description and from the drawings, in which:

Figure 1 is a sectional view through one form of torch chosen for illustration.

Fig. 2 is a similar but fragmentary view of a modified form of the invention.

Fig. 3 is a transverse sectional view taken along the line 3—3 of Fig. 1.

Fig. 4 is a transverse sectional view taken along the line 4—4 of Fig. 1.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements or combinations in which the inventive concepts are found.

The construction of the torch shown in Fig. 1 consists of a handle portion 11 including a connecting portion or shank 12 and a head portion 13. These three main portions of the torch are fused together to form a single piece unit. The handle portion 11 and the connecting portion 12 are sections of thin walled seamless tubing, preferably of brass. The end of the handle portion is sealed to be watertight by a metal disk 14 which is fused to the end of the tube 11. By fusing the handle assembly to the head portion 13 the handle assembly becomes a watertight chamber 16. During welding this chamber 16 is completely flooded with circulating water which enters the chamber through a hose connection and a short length of small diameter tubing 17 fused to an opening in the disk 14. The water flows from chamber 16 through one or more ports 18 where it enters the central chamber 19 of the head portion 13 and through which the electrode 21 extends. Here the water picks up heat from the torch head 13. From the head chamber 19 the water flows through ports 22 which are provided at the lower end of tube 23 which houses the electrode. At this point it performs its chief function of picking up heat from electrode 21. It then continues to flow up through the cavity 24 absorbing additional heat as it travels up from the tip of the electrode. From this cavity the water flows through the ports 26 and annular groove 27 and enters a tube 28 which passes directly through the handle 11. This tube 28 passes through disk 14 to which it is fused and watertight. The tube 28 extends beyond the disk approximately one inch to provide for attaching a small rubber hose which carries the circulated water to a drain or cooler.

A second small seamless tube 31 passes directly through disk 14 and the handle for conducting the gas which is used for shielding the welding zone. This second tube is also fused to the disk 14. Such sealing is necessary to prevent water from entering this gas-conducting tube. This tube also extends approximately one inch beyond the end of the handle to provide for the attachment of the hose which conducts the gas to the torch. From the tube 31 the shielding gas enters what might be called a second outer chamber in the head portion 13 of the torch through a passage 32. This second chamber is formed by the body 33 of head 13 and an outer nozzle 34 which screws onto the torch head's body 33. The shielding gas flows from this second chamber down through six or more slots 36, which are milled in the lower end of the body 33, into the open end of the nozzle to flood the welding zone and protect the end of the electrode and the molten work piece metal from air.

The nozzle 34 is preferably made from copper with a thick coating of vitreous enamel bonded to its surface to act as an electrical insulator should the nozzle be accidentally brought in contact with the work piece.

Where the electrode 21 is gripped in the head of the torch, the connection is made water pressure tight by forcing a soft metal ferrule 37, preferably of copper, into a conical seat 38. The ferrule is pressed down into the conical seat 38 by turning the tube 23 threaded at its upper end to body 33. The upper end of the tube 23 is provided with a slot to accommodate a screw driver. The top of the torch is made water pressure tight by turning a cap 41 on the end of the pressure tube 23. A washer 42 completes the seal and, being of an insulating material, extends beyond the diameter of the head so that the torch will not short out if laid down on the work piece.

The handle 11 of the torch is insulated by slipping a piece of rubber tubing 44 over the seamless tube section. The inside diameter of the rubber tube is slightly smaller than the outside diameter of the metal tube, so that no screws or further means are required for tightly holding the rubber tube in place. The rubber tube 44 extends beyond the end of the metallic handle portion so as to protect the connections of the water circulating rubber hose and the inert gas rubber hose to the handle portion, and also to electrically insulate the socket or lug 46 which is provided for connecting the welding cable to the torch. As best shown in Fig. 3, the lug 46 is fused directly to the disk 14.

Fig. 2 illustrates another method by which a refrigerant can be brought into direct contact with the surface of the electrode. In this particular model a short length 51 of tungsten electrode rod is silver brazed into the base 52 of the electrode and the conical seat is the reverse of that shown in Fig. 1. A separate conical copper washer may be provided, but if the base 52 is made of copper, as preferred for best conductivity, the washer will probably not be necessary. Water flows downward through chamber 53 in contact with the outside of electrode base 52, then through ports 54 and up along the inside surface of electrode base 52. The necessary good conductivity between the electrode insert and surfaces in contact with the water results from the silver brazing which in effect makes the insert 51 and the electrode base 52 one unitary piece. The entire area of the insert within the base should be brazed to the base. The high conductivity of the silver solder, the larger cross-section of the base, and greater surface contact with water result in faster conduction of heat to the water than in Fig. 1, but the electrode unfortunately cannot be advanced if anything occurs to deleteriously affect its tip.

Although both designs will accomplish the desired result, the design in Fig. 1 is preferred.

The ports 22 and 54 are preferably located as low as practical so as to maintain a good circulation of water as close as practical to the tip of the electrode. In a smaller size of torch, or by some shortening of dimensions in the illustrated size (shown at full scale in the original patent drawings) it is possible to cool the electrode by water contact at least as close to the tip as one-half inch. Even if this spacing is one inch, the torch will handle most work. Of course the closer the spacing the greater the permissible welding current. Any liquid cooling of the electrode itself, including the composite unitary form of Fig. 2, may be deemed to utilize the invention, if imperfectly. Likewise, any cooling by direct contact of the electrode with a coolant having greater cooling capacity than the uncooled inert gas (used heretofore) may be deemed to be within some aspects of this invention, although gas would not be as satisfactory as water for high welding currents, at least not unless the gas is greatly cooled.

The position of the threads for tightening the contact between the head body and the electrode (or ferrule) is improved by the present invention. Heretofore threads for this purpose have been at the bottom of the head, and hence subjected to high temperatures. They gave a great deal of trouble. In the illustrated forms the threads are at the far end of the head where they are protected from high temperatures by the intervening circulation of water. The body of the head is preferably formed of stainless steel.

From the foregoing it is seen that a thoroughly practical form of torch has been provided which draws heat from the electrode near its tip so fast that high welding currents can be used for inert gas welding where drops of molten electrode must not be permitted to pass to the work piece.

I claim:

1. An electric arc welding torch including a head adapted to hold an electrode at a point near an exposed end thereof, said head having a coolant passage formed in part by and surrounding said electrode to carry liquid in direct contact with the electrode, and means for passing liquid through said passage, and carrying the liquid away from the torch.

2. An electric arc welding torch including a head adapted to hold an electrode at a point near an exposed end thereof, said head having a coolant passage to carry liquid in direct contact with the electrode, and means for passing liquid through said passage, and carrying the liquid away from the torch.

3. An electric arc welding torch including a head adapted to hold an electrode at a point near an exposed end thereof, said head having a coolant passage formed in part by and surrounding said electrode to carry liquid in direct contact with the electrode close beyond the holding point from the tip, and means for passing liquid through said passage, and carrying the liquid away from the torch.

4. The combination of a unitary arc welding electrode having at least as high conductivity throughout its length as adjacent the tip portion thereof, and a torch including a head having means engaging said electrode at a point near the tip thereof while the tip is completely exposed for forming an arc between it and the work and means for flowing liquid into contact with the surface of the electrode beyond said point of engagement from the tip, but close to said point of engagement for drawing heat from said tip, and carrying the liquid away from the torch.

5. The combination of a unitary arc welding electrode having at least as high conductivity throughout its length as adjacent the tip portion thereof, and a torch including a head having means engaging said electrode at a point near the tip thereof while the tip is completely exposed for forming an arc between it and the work and means for flowing liquid into contact with the surface of the electrode beyond said point of engagement from the tip, and carrying the liquid away from the torch.

6. The combination of an arc welding electrode and a torch head for operating said electrode including means for engaging said electrode near an exposed end thereof, said head having passages for flowing a gas through the head to surround the exposed end, and independent passages for circulating coolant in contact with the electrode just beyond the point of engagement from the exposed end.

7. An electric arc welding torch including a head adapted to hold an electrode at a point near an exposed end thereof, said head including a body portion having a longitudinal opening therein which at its lower end converges downwardly in a conical shape, a gripping ferrule wedged in said conical shaped position and surrounding and gripping the electrode, a tube pressing at its lower end on said ferrule and at a remote point having a threaded engagement with said body, perforations in said tube near its bottom end and at a point spaced upwardly therefrom, and means for flowing water through the perforations at the bottom end along the electrode in contact therewith and through the other perforations.

8. An electric arc welding torch including a head adapted to hold an electrode at a point near an exposed end thereof, said head including a body portion having a longitudinal opening therein which at its lower end converges downwardly in a conical shape, an electro-conductive gripping ferrule wedged in said conical shaped portion and surrounding and gripping the electrode, a tube pressing at its lower end on said ferrule and at a remote point having a threaded engagement with said body.

9. An electric arc welding torch including a head adapted to hold an electrode at a point near an exposed end thereof, said head including a body portion having a longitudinal opening therein which at its lower end has a converging portion, an electrode holder wedged in said portion, and tightening means including a tube and threaded means at a point remote from the converging portion for tightening the wedging action of the holder, said torch including a coolant passage within said tube between the threaded means and the converging portion.

10. The combination of a unitary arc welding electrode having at least as high conductivity throughout its length as adjacent the tip portion thereof, and a torch including a head having means engaging said electrode at a point near the tip thereof while the tip is completely exposed for forming an arc between it and the work and means for flowing liquid into contact with the surface of the electrode beyond said point of engagement from the tip, said electrode including a base having a liquid passage therethrough communicating with said liquid flowing means.

11. The combination of an arc welding electrode and a torch head for operating said electrode including means for engaging said electrode near an exposed end thereof and having a longitudinal central channel receiving said electrode and forming a passage around it along part of its length and coolant ports communicating with said passage at longitudinally spaced points, and conduit means communicating separately with said ports through the head remote from the exposed end of the electrode.

12. An electric arc welding torch including a head adapted to hold an electrode, a collet in the form of a continuous ring of malleable metal of high electrical conductivity in said head at the welding end for gripping the electrode, and threaded means at the opposite end of the head for deforming said collet to grip the electrode.

13. An electric arc welding torch including a head adapted to hold an electrode, a collet in the form of a continuous ring of malleable metal of high electrical conductivity in said head at the welding end for gripping the electrode, and threaded means for deforming said collet to grip the electrode.

14. An electric arc welding torch including a head adapted to hold an electrode, a collet in the form of a continuous ring of malleable metal of high electrical conductivity in said head at the welding end for gripping the electrode, and threaded means for deforming said collet to grip the electrode, said torch having a coolant passage sealed by said collet.

15. The combination of an arc welding electrode and a torch head for operating said electrode including means for engaging said electrode near an exposed end thereof and having a longitudinal central channel receiving said electrode and forming a passage around it along part of its length and coolant ports communicating with said passage at longitudinally spaced points, and conduit means communicating separately with said ports through the head remote from the exposed end of the electrode, said electrode being of unitary character from its tip through the portion thereof surrounded by said passage, and having at least as high thermal conductivity from its tip through said portion as adjacent its tip.

ARTHUR A. BERNARD.

REFERENCES CITED

The following references are of record in the file of this patent:

UNITED STATES PATENTS

| Number | Name | Date |
|---|---|---|
| 1,031,710 | Hanaman | July 9, 1912 |
| 1,534,688 | Collins | Apr. 21, 1925 |
| 2,014,226 | Catlett | Sept. 10, 1935 |
| 2,052,796 | Rava | Sept. 1, 1936 |
| 2,240,627 | Riemenschneider | May 6, 1941 |
| 2,468,804 | Breymeier | May 3, 1949 |